United States Patent
Rivera et al.

(10) Patent No.: US 9,817,748 B2
(45) Date of Patent: Nov. 14, 2017

(54) UNIFIED INTERFACE FOR DEVELOPMENT AND TESTING OF DEPLOYMENT RESOURCE ARCHITECTURE

(71) Applicant: CA, Inc., Islandia, NY (US)

(72) Inventors: Miguel A. Rivera, Mastic Beach, NY (US); Rich J. Lau, Deer Park, NY (US); Fang Yang, South Setauket, NY (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 15/088,102

(22) Filed: Mar. 31, 2016

(65) Prior Publication Data

US 2017/0286266 A1    Oct. 5, 2017

(51) Int. Cl.
G06F 9/44 (2006.01)
G06F 11/36 (2006.01)

(52) U.S. Cl.
CPC ...... G06F 11/3664 (2013.01); G06F 11/3684 (2013.01); G06F 11/3688 (2013.01); G06F 11/3692 (2013.01)

(58) Field of Classification Search
None
See application file for complete search history.

(56) References Cited

U.S. PATENT DOCUMENTS

2014/0359565 A1* 12/2014 Frankel .................. G08C 17/02
717/106

\* cited by examiner

*Primary Examiner* — Chuck Kendall
(74) *Attorney, Agent, or Firm* — Patent Capital Group

(57) ABSTRACT

Embodiments of the disclosure pertain to providing, via a graphical user interface, a set of user-selectable resources available for defining a resource architecture for an application in development; receiving, via the graphical user interface, a selection of a first resource for the application; receiving, via the graphical user interface, a selection of a second resource for the application; functionally connecting the first resource with the second resource, wherein the first resource, the second resource, and the logical relationship between the first resource and the second resource define the resource architecture for the application; verifying the resource architecture, wherein verifying the resource architecture comprises communicating over a network with the first resource and with the second resource and verifying that the first resource can communicate over a network with the second resource; and providing a graphical indication of a result of the verification of the resource architecture.

18 Claims, 11 Drawing Sheets

UNIFIED INTERFACE FOR DEVELOPMENT AND TESTING OF DEPLOYMENT RESOURCE ARCHITECTURE

TECHNICAL FIELD

This disclosure pertains to a unified interface for development and testing of deployment resource architectures.

BACKGROUND

Continuous delivery (CD) is used to provide software solutions in short timeframes. In some cases, multiple teams can work to provide updated software solutions in parallel to development of newer software versions. The distributed nature of CD can result in inconsistencies in deployment resource architecture across multiple versions of application software.

SUMMARY

Aspects of the embodiments are directed to a method that includes providing, via a graphical user interface, a set of user-selectable resources available for defining a resource architecture for an application in development; receiving, via the graphical user interface, a selection of a first resource for the application; receiving, via the graphical user interface, a selection of a second resource for the application; functionally connecting the first resource with the second resource, wherein the first resource, the second resource, and the logical relationship between the first resource and the second resource define the resource architecture for the application; verifying the resource architecture, wherein verifying the resource architecture comprises communicating over a network with the first resource and with the second resource and verifying that the first resource can communicate over a network with the second resource; and providing a graphical indication of a result of the verification of the resource architecture.

Aspects of the embodiments are directed to a computer program product that includes a computer readable storage medium comprising computer readable program code embodied therewith. The computer readable program code may include computer readable program code configured to provide a graphical user interface, the graphical user interface comprises a set of user selectable resources and a canvas onto which a user can drag and drop resources to indicate a selection of a resource for defining a deployment environment; computer readable program code configured to receive, via the graphical user interface, a drag-and-drop command for selecting of a first resource for the application, wherein the drag-and-drop command comprises a user dragging and dropping a graphical representation of the first resource onto a canvas area of the graphical user interface; computer readable program code configured to receiving, via the graphical user interface, a drag-and-drop command for selecting of a second resource for the application, wherein the drag-and-drop command comprises a user dragging and dropping a graphical representation of the second resource onto a canvas area of the graphical user interface; computer readable program code configured to receive an indication of a functional connection between the first resource and the second resource, wherein the first resource, the second resource, and the function connection between the first resource and the second resource define the resource architecture for the application; computer readable program code configured to verify the resource architecture, wherein verifying the resource architecture comprises communicating over a network with the first resource and with the second resource and verifying that the first resource can communicate over a network with the second resource; and computer readable program code configured to providing a graphical indication of a result of the verification of the resource architecture.

Aspects of the embodiments are directed to a system that includes an environment manager implemented at least partially in hardware, the environment manager configured to provide an architecture graphical user interface for forming a deployment resource architecture and a deployment graphical user interface for testing the deployment resource architecture in a deployment stage and for editing the deployment resource architecture to conform to a deployment stage; an environment repository for storing the deployment resource architecture and for storing a deployment resource architecture template; a test repository for storing preconfigured tests for testing the deployment resource architecture in the deployment graphical user interface; and a test execution module implemented at least partially in hardware and configured to execute a test of the application using the deployment resource architecture.

Some embodiments also include providing a graphical representation of a deployment stage for the application; and displaying the resource architecture for the application with the deployment stage.

In some embodiments, displaying the resource architecture comprises displaying a first resource architecture comprising the selected resource within a first server context at a first deployment stage. Aspects may also be directed to receiving an instruction to move the first resource architecture to a second deployment stage different from the first deployment stage; receiving an instruction to associate the resource to a second server context, different from the first server context; defining a second resource architecture that comprises the resource associated with the second server context; and associating the second resource architecture with the second deployment stage.

In some embodiments, the second resource architecture associated with the deployment stage defines a runtime server environment for executing deployment of the application during the deployment stage.

In some embodiments, the graphical representation of the deployment stage comprises a user selectable executable instruction. Some embodiments also include receiving a selection of an executable instruction for the application; and associating the executable instruction with the second resource architecture and the deployment stage.

Some embodiments also include receiving, via a user-selectable interface, an instruction to advance the first resource architecture from a first deployment stage to a second deployment stage; providing a list of tests to be executed on the application between the first deployment stage and the second deployment stage; receiving a selection of a test to be executed on the application; and storing a selected test with the first resource architecture in the first deployment stage.

Some embodiments also include providing an indication of whether the application passed the tests applied to the application between the first deployment stage and the second deployment stage.

Some embodiments also include providing a graphical representation of a data recorder through the graphical user interface; and receiving an input from a user via the graphical user interface to include a data recorder at an output of the resource, the data recorder configured to record data from the output of the resource during execution of the application at the deployment stage.

Some embodiments also include executing the application in a deployment stage using data recorded by the data recorder.

Some embodiments also include providing a graphical representation of a first version of the resource architecture in a first deployment stage; and providing an interface to test a second version of the resource architecture in second deployment stage while simultaneously displaying the first version of the resource architecture in the first deployment stage.

Some embodiments also include providing a graphical representation of a test failure for the second version of the resource architecture.

Some embodiments also include providing a graphical representation of a test failure for the resource architecture between two server contexts.

Some embodiments also include computer readable program code configured to provide a graphical representation of a deployment stage for the application; and computer readable program code configured to display the resource architecture for the application with the deployment stage.

In some embodiments, displaying the resource architecture may include displaying a first resource architecture comprising the selected resource within a first server context at a first deployment stage. Some embodiments also include computer readable program code configured to receive an instruction to move the first resource architecture to a second deployment stage different from the first deployment stage;

computer readable program code configured to receive an instruction to associate the resource to a second server context, different from the first server context;

computer readable program code configured to define a second resource architecture that comprises the resource associated with the second server context; and computer readable program code configured to associate the second resource architecture with the second deployment stage.

In some embodiments, the second resource architecture associated with the deployment stage defines a runtime server environment for executing deployment of the application during the deployment stage.

In some embodiments, the graphical representation of the deployment stage comprises a user selectable executable instruction; and wherein some embodiments also include computer readable program code configured to receive a selection of an executable instruction for the application; and computer readable program code configured to associate the executable instruction with the second resource architecture and the deployment stage.

Some embodiments also include computer readable program code configured to receive, via a user-selectable interface, an instruction to advance the first resource architecture from a first deployment stage to a second deployment stage; computer readable program code configured to provide a list of tests to be executed on the application between the first deployment stage and the second deployment stage; computer readable program code configured to receive a selection of a test to be executed on the application; and computer readable program code configured to store a selected test with the first resource architecture in the first deployment stage.

Some embodiments also include computer readable program code configured to provide an indication of whether the application passed the tests applied to the application between the first deployment stage and the second deployment stage.

Some embodiments also include computer readable program code configured to provide a graphical representation of a data recorder through the graphical user interface; and computer readable program code configured to receive an input from a user via the graphical user interface to include a data recorder at an output of the resource, the data recorder configured to record data from the output of the resource during execution of the application at the deployment stage.

DETAILED DESCRIPTION

This disclosure describes how applications and their deployment can be tested, managed; and how any change to any part of this process can be done in a visual and more intuitive way. This disclosure also describes how an application architectural model can be mapped across environments during each deployment stage in an intuitive and graphical way.

Figure 1:
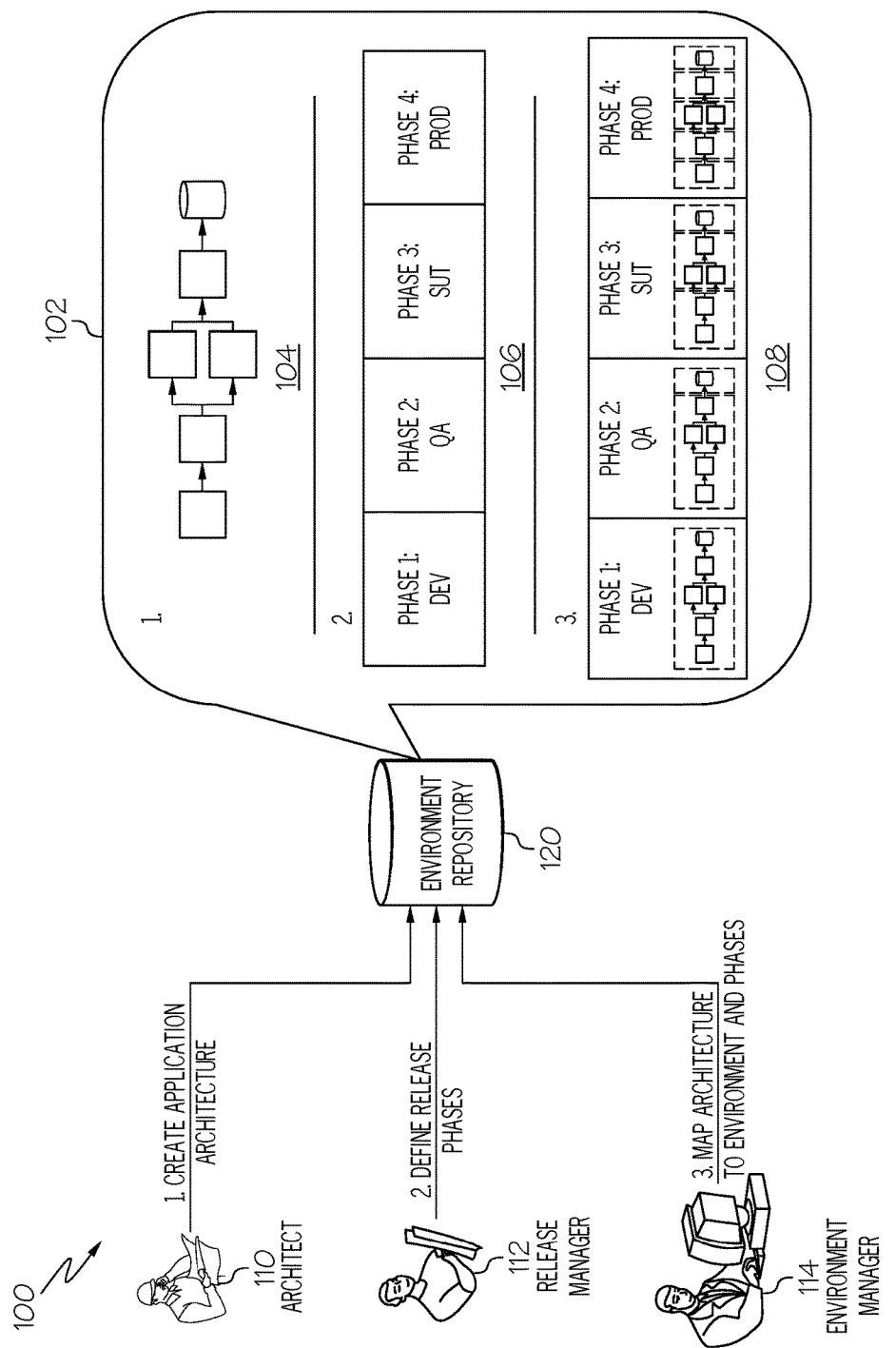
FIG. 1 is a schematic diagram of a deployment resource architecture system in accordance with embodiments of the present disclosure.

FIG. 1 is a schematic diagram of a deployment resource architecture system 100 in accordance with embodiments of the present disclosure. The system 100 includes an interface 102 that provides a user with a graphical representation of a resource architecture 104, the deployment stages 106, and an interface 108 to view and edit the resource architecture based on the development stage.

The interface 102 can be available to any pertinent user of a development system, such as an application architect 110, a release manager 112, an environment manager 114, a quality assurance engineer (not shown), etc. Each user may be interested in a different stage of development. The interface 102 provides a way to view and/or edit the resource architecture for the stage pertinent to the user, and also a way to track versions and resource architecture changes that may have occurred between stages.

The system 100 may also include a repository 120 for storing resource architecture versions. The interface 102 can communicate with the repository 120 to store resource architecture information and to retrieve stored resource architectures.

Figure 2:
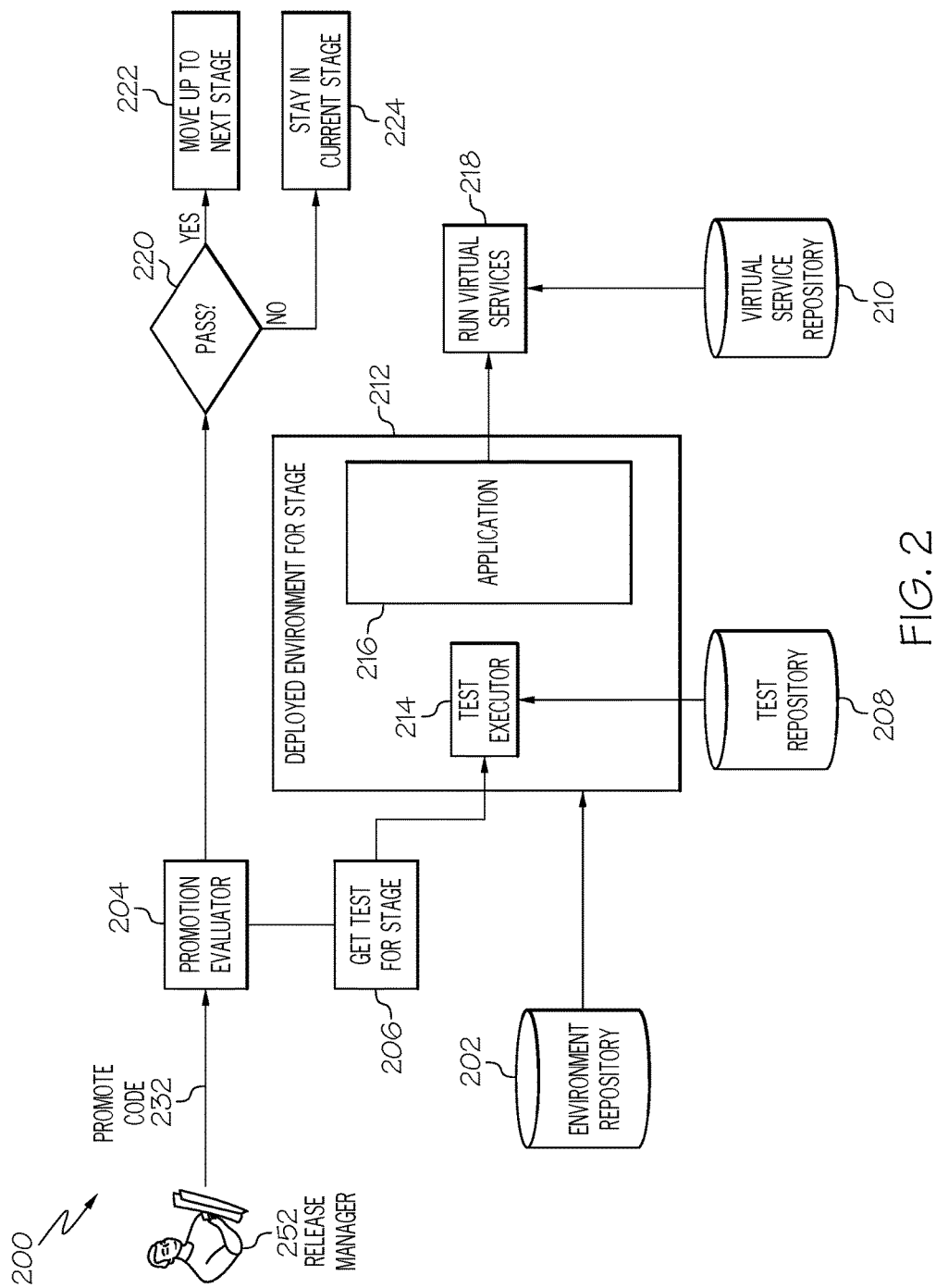
FIG. 2 is a schematic diagram of a deployment resource architecture testing system in accordance with embodiments of the present disclosure.

FIG. 2 is a schematic diagram of a deployment resource architecture testing system 200 in accordance with embodiments of the present disclosure. The testing system 200 includes example hardware and software modules used in the testing of resource architectures for an application deployment for a deployment stage.

For example, a release manager 252 may wish to promote a resource architecture from a first stage to a second stage. The release manager 252 can use the interface 102 to implement a promote code 232. Execution of promote code 232 engages the promotion evaluator module 204, implemented at least partially in hardware. The promotion evaluator 204 can retrieve a test advancing the resource architecture from a first stage to a second stage (206). Tests can be stored in a test repository 208. Tests for a stage can be configured during promotion between stages or can be preconfigured to run when selecting a promotion button. Preconfiguring a test can associate the test with the development stage and with the resource architecture (stored in an environment repository 202).

The deployed environment for the stage 212 can be tested based on a predefined test taken from the test repository 208. The test executor module 214 can execute the test using the resource architecture and the application 216. In some embodiments, the application 216 can be run using data collected from running a virtualization of the application using resources configured in the resource architecture (218). Virtualization services can be provided through a virtual service repository 210.

If a resource architecture fails a test, the resource architecture cannot be promoted to the next stage (224). An indication of the failure can be displayed on the user interface. Additionally, if possible, location or source of the test failure can be displayed to the user using the interface. If the test passes, the resource architecture can be promoted to the next stage (222). An indication of a passed test will be displayed.

Figure 3:
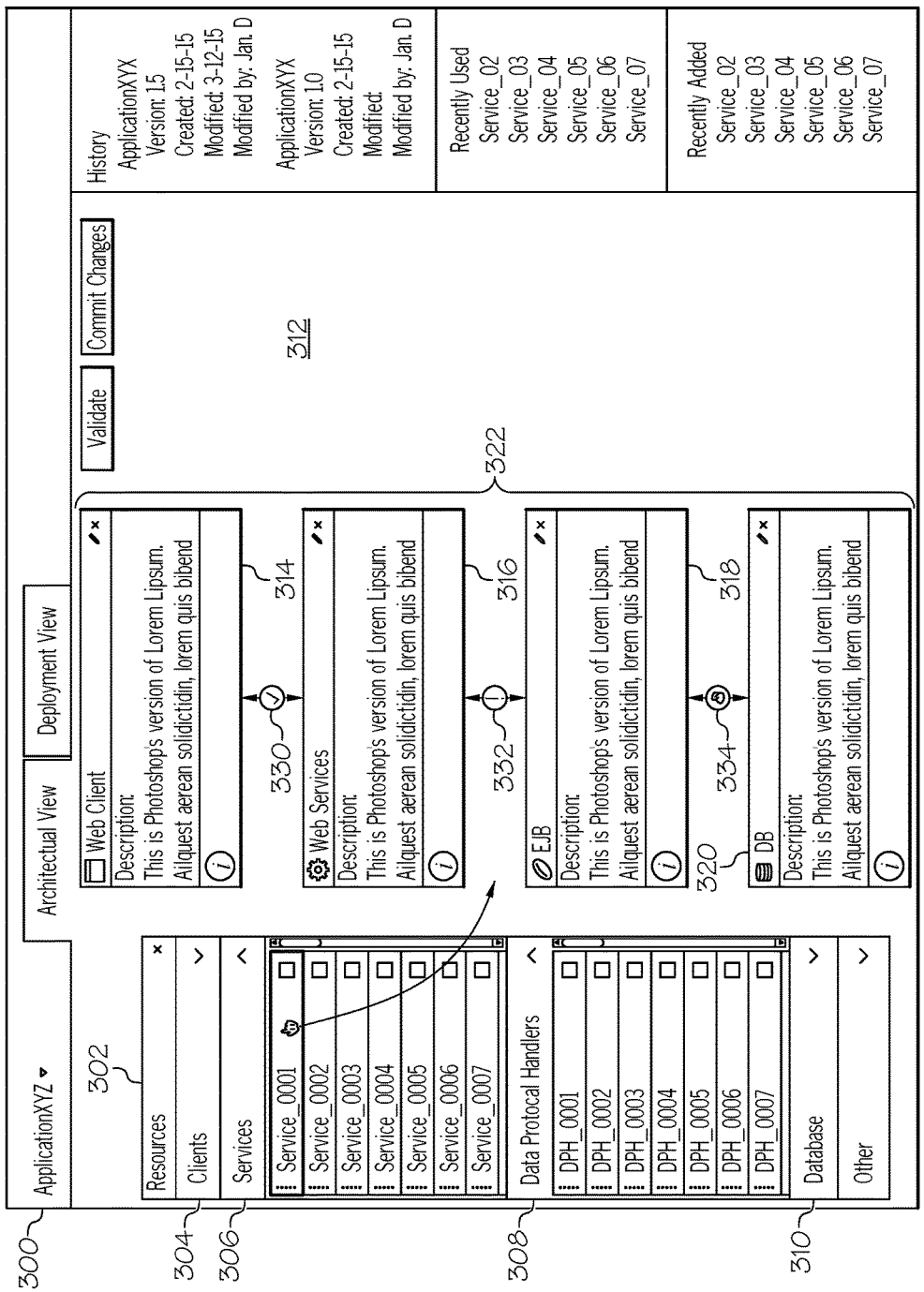
FIG. 3 is an example screenshot of a graphical user interface for building a resource architecture in accordance with embodiments of the present disclosure.

FIG. 3 is an example screenshot of a graphical user interface for building a resource architecture in accordance with embodiments of the present disclosure. The application architectural view 300 provides a canvas 312 for building the resource architecture. The view 300 also includes a palette of available resources 302. The palette of available resources 302 can be shown as a drop down menu of resource choices. In the example shown in view 300, the resources 302 include clients 304, services 306, data protocol handlers 308, database resources 310, and others.

The user can select available applications and show its architectural model 322 in a graphical way. The architectural model 322 can include containers that represent the individual resources that make up the system to be tested. In the example shown in view 300, the architectural model 322 includes a web client 314, a web service 316, data protocol handler 318, and a database 320.

In some embodiments, the user can build an architectural model. Each resource can be "dragged and dropped" on the canvas 312. After dragging and dropping a resource, the resource can be functionally linked to another resource. For example, the web client resource 314 can be functionally linked to the web service resource 316 by an arrow 330.

In some embodiments, for predefined resource configurations, the web client resource can ping the web services resource to verify compatibility and functionality. In the view 300 shown, the arrow with a check mark 330 indicates a functional linkage between resources.

In some embodiments, the resources are undefined. After a user has constructed the architecture model 322, the user can define the resources. Linking the resources at that point can cause each resource to ping a subsequent resource to verify functionality and compatibility.

The user is also able to make adjustments to predefined architecture models 322 by selecting resource components from a palette 302 and dragging the resource onto the canvas 312. In some embodiments, the system automatically connects the new resource components. Resources can also be removed from the architectural model 312.

The resources can be pre-configured, edited, or a new one can be created.

If any of the resource components experiences any problems during functional verification, the user interface can provide a visual feedback of the problem and where along the architectural diagram it occurred. For example, in view 300 a warning is indicated by an arrow with an exclamation point 332 between the web services resource 316 and the data protocol handler 318. In view 300, the user interface indicates an error by an arrow with an error indicator 334. Arrow 334 shows an error between data protocol handler resource 318 and database resource 320.

In some embodiments, arrow colors can be selected to provide further visual cues as to the functionality of resources.

A user can store an architecture model 322 in an environment repository, as shown in FIG. 1.

Figure 4:
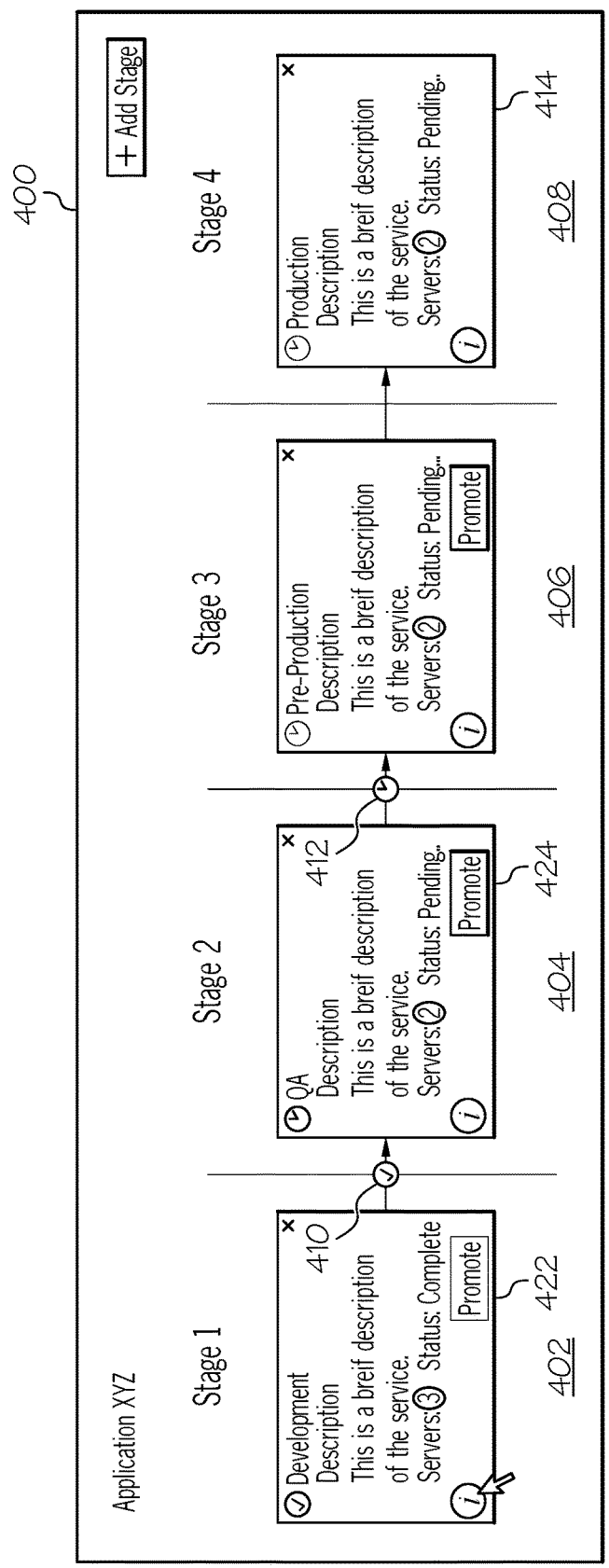
FIG. 4 is an example screenshot of a deployment view of the graphical user interface for visualizing deployment stages for an application in accordance with embodiments of the present disclosure.

FIG. 4 is an example screenshot of a deployment view 400 of the graphical user interface for visualizing deployment stages for an application in accordance with embodiments of the present disclosure. The deployment view 400 shows stages that the application must be promoted to before the application is ready to be used in a real world scenario. Stages are shown as graphical containers that can either be removed, or added as needed by the project. Example stages include development stage 402, QA stage 404, pre-production 406, and production 408. Each stage tile can include specific high-level information about that particular stage including its status, and the number of servers allocated to it.

The view 400 can show whether an application has passed promotion from one stage to another. For example, there is an arrow with a check box 410 between development stage 402 and QA stage 404. The arrow with a check mark 410 indicates a verified promotion between stages. In some cases, when a promotion between stages is being analyzed, an arrow with a clock 412 can be used to signal a pending promotion. Other indicators can also be used to provide a visualization of the promotion of the application across stages.

A promote button 422 is greyed out in the development stage because the application has already passed promotion analysis. A promotion button in the QA stage 424 is not greyed out, because promotion analysis is still pending.

Figure 5A:
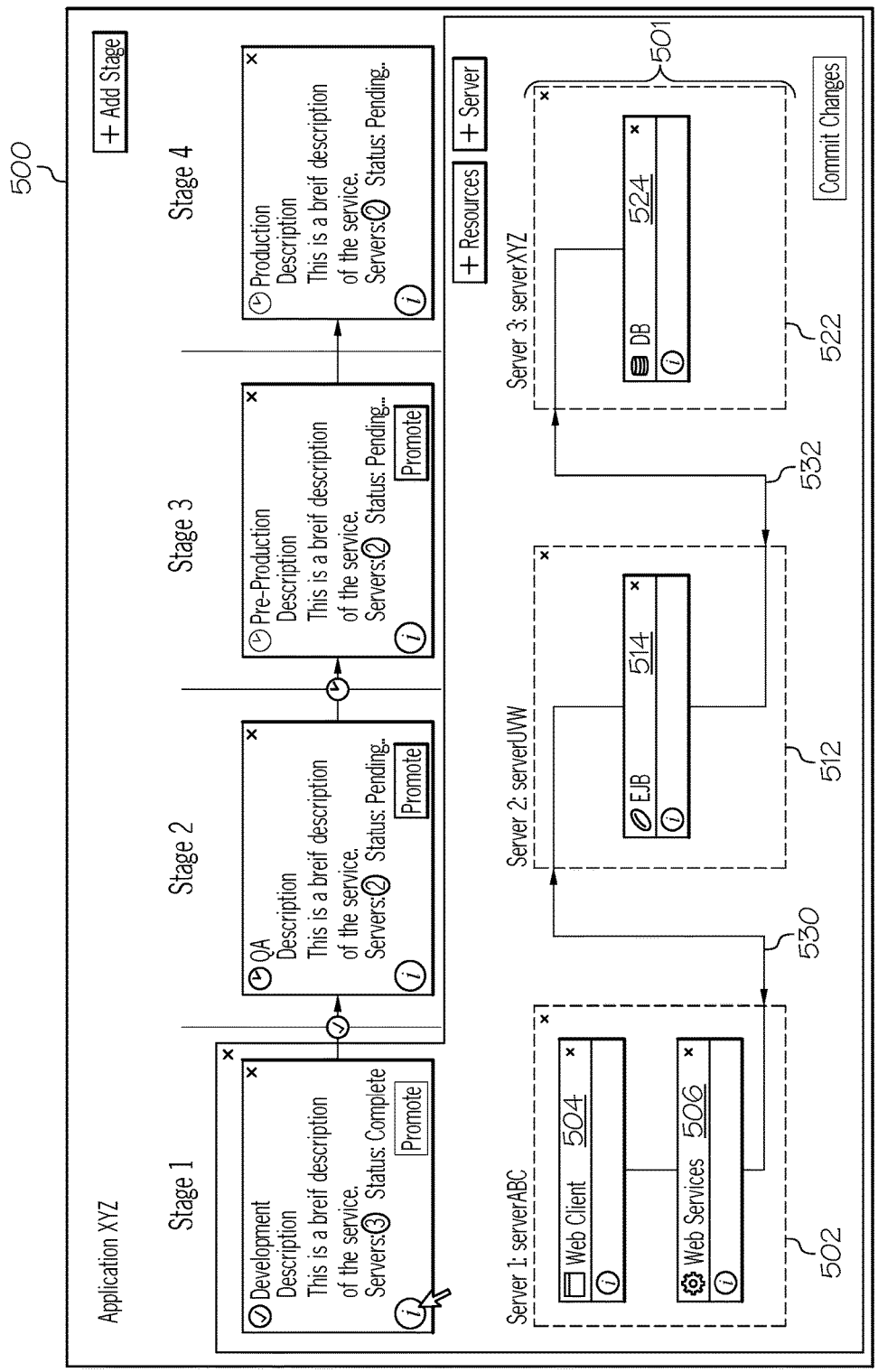
FIG. 5A is an example screenshot of a graphical user interface visualizing a development stage resource architecture in accordance with embodiments of the present disclosure.

FIG. 5A is an example screenshot of a deployment view 500 of a graphical user interface visualizing a development stage resource architecture in accordance with embodiments of the present disclosure. The user can reveal the application architectural model 501, the servers 502, 512, and 522, and linkages 530 and 532 indicating how the application resources map across the servers in a graphical way by clicking on a button, or such, on any of the stage tile.

As shown in FIG. 5A, each server shows a resource hosted by the server. For example, for the development stage, server 502 includes a web client resource 504 and a web service resource 506. The server 512 includes a data protocol handler resource 514. Server 522 includes a database resource 524.

Since each stage is independent of the others, each stage can be edited by a user to suit the need of that particular stage. Some of the things a user might want to do is to change the number of servers a particular stage utilizes, and/or add resource tools such as a recorder to virtualize a service, or add a virtualized service (in place of a resource) in the application architecture displayed.

Figure 5B:
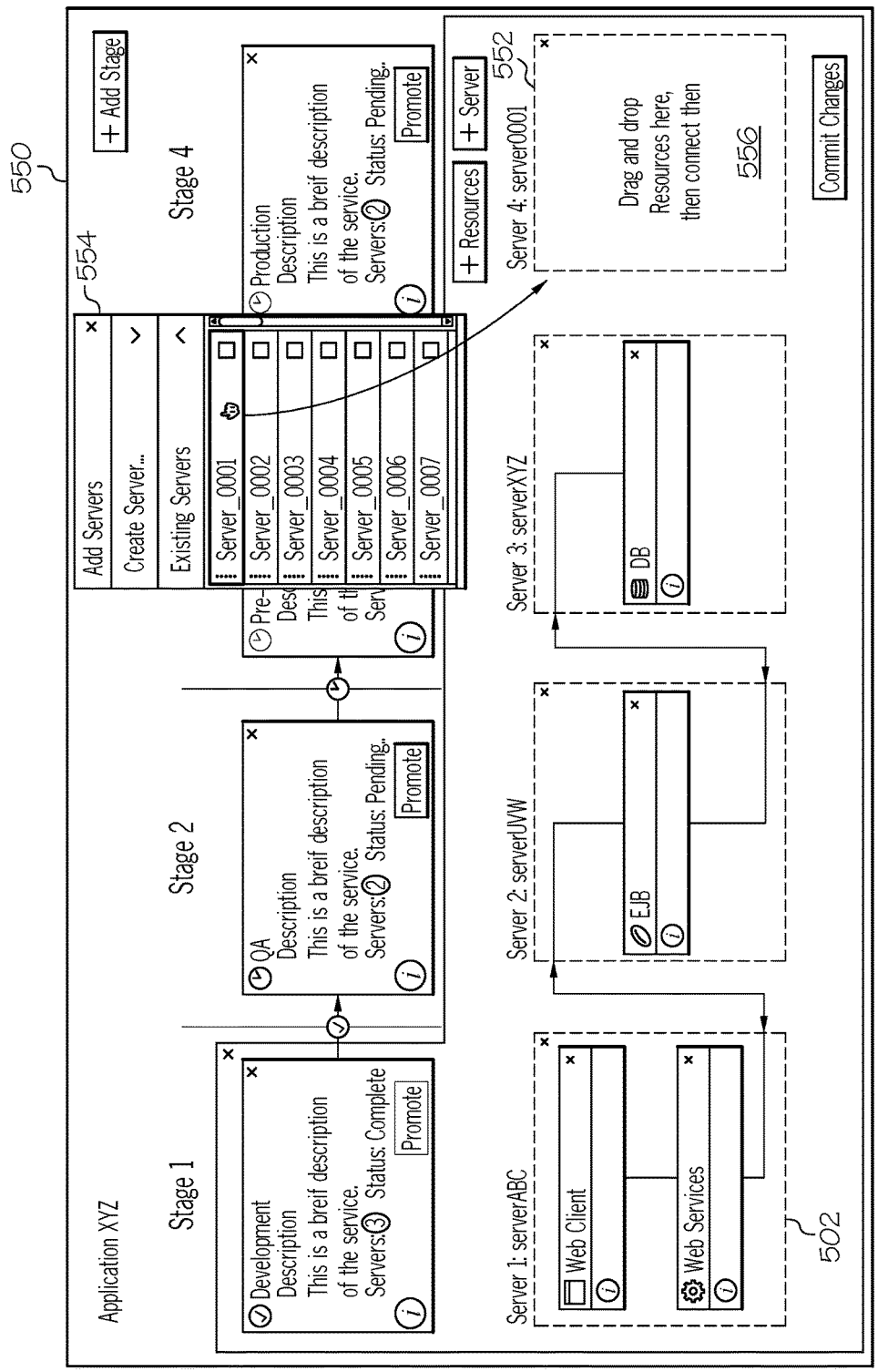
FIG. 5B is an example screenshot of a graphical user interface for augmenting a resource architecture with additional servers in accordance with embodiments of the present disclosure.

FIG. 5B is an example screenshot of a deployment stage 550 of a graphical user interface for augmenting a resource architecture with additional servers in accordance with embodiments of the present disclosure. Servers 552 can be added by opening a list or palette of servers 554 that are already pre-configured or create a new one, and drag it onto the canvas 556 in the desired order. The application resources will automatically be placed within the closest servers, or the user can manually select and drag each resource and place within the desired server. Throughout this process the connections between application resources remain intact.

Figure 5C:
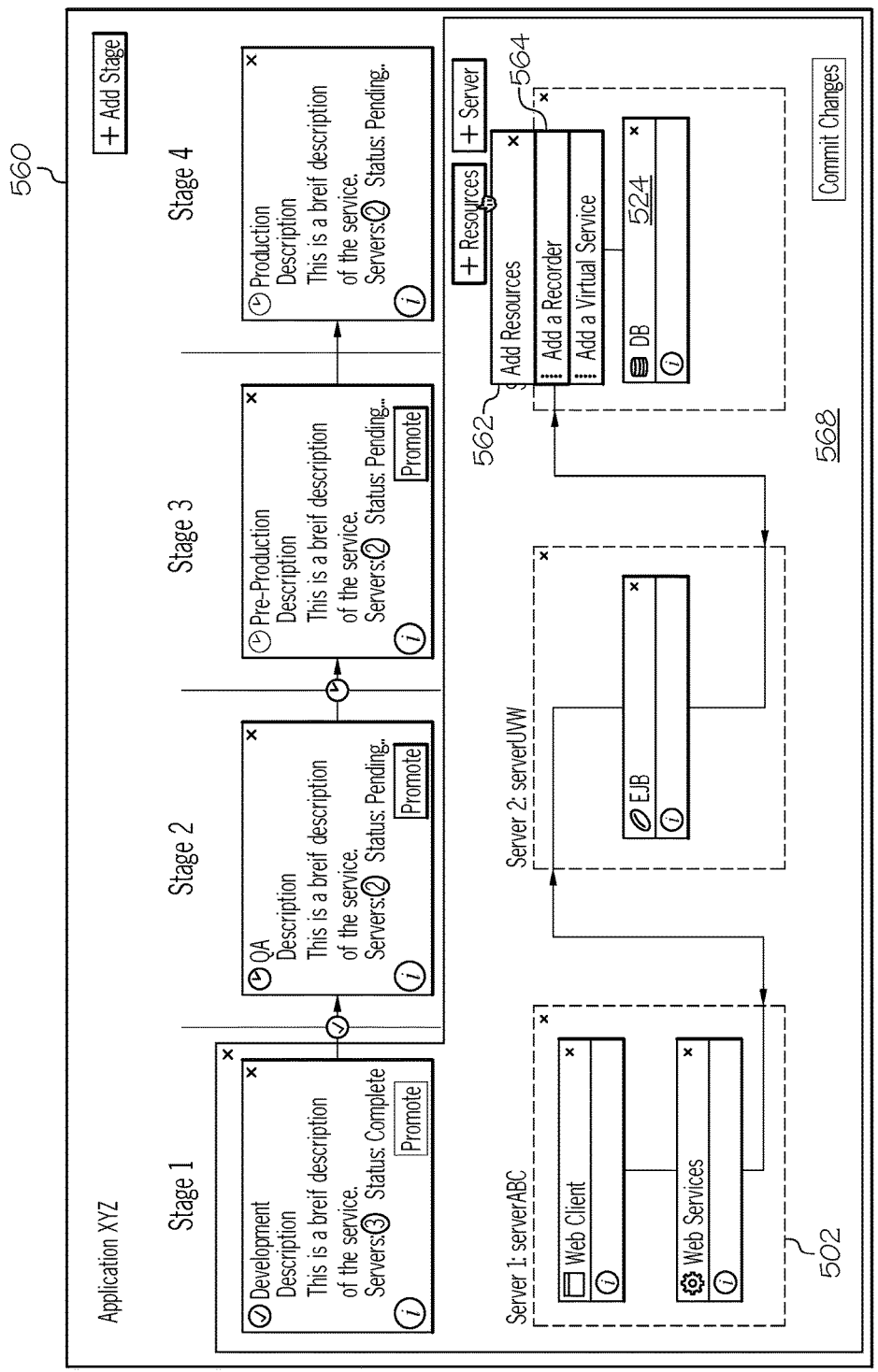
FIG. 5C is an example screenshot of a graphical user interface for augmenting a resource architecture with additional resources in accordance with embodiments of the present disclosure.
Figure 5D:
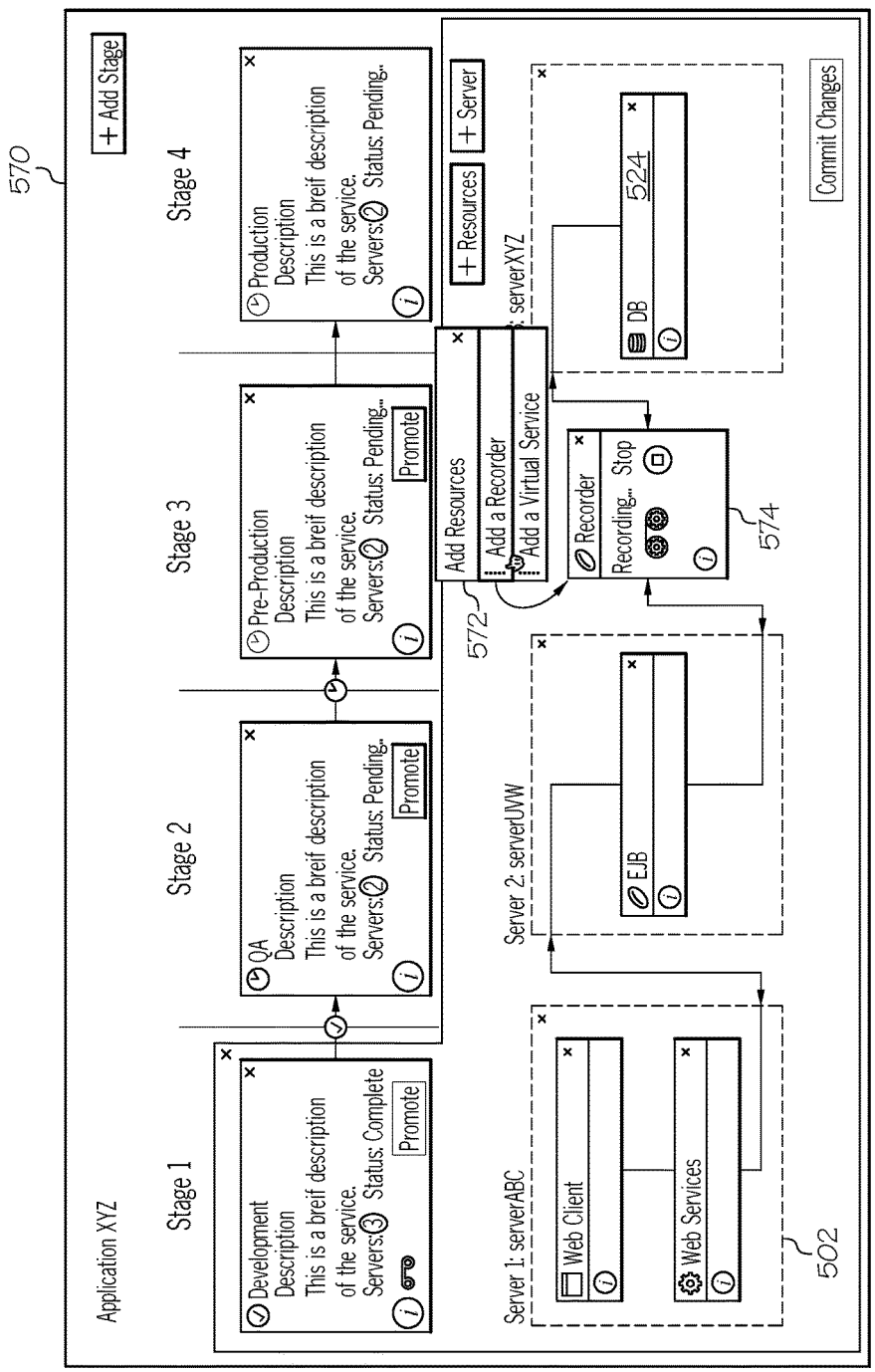
FIG. 5D is an example screenshot of a graphical user interface for augmenting a resource architecture with a recording resource in accordance with embodiments of the present disclosure.

FIG. 5C is an example screenshot of a graphical user interface for augmenting a resource architecture with additional resources in accordance with embodiments of the present disclosure. Adding resource tools is also a matter of opening a list or a palette 562 of available resource tools (e.g., recorder 564 and virtual service 566), and dragging the resource onto the canvas 568 where the resource tools are automatically connected to the application architectural model. FIG. 5D is an example screenshot of a graphical user interface for augmenting a resource architecture with a recording resource 572 in accordance with embodiments of the present disclosure. For example, if the user wants to virtualize a database in stage 1, the user can expose the servers and applications detail view and drag a recorder 572 resource onto the canvas, and drop it between the database 524 and the items before it. The links between the recorder icon 574, the database resource 524 and the other item (such as a web service) can be connected automatically and is ready to record.

All of the basic functionalities of the resource tools are available within the graphical user interface view, so as to not require navigating to another view. The recorder and other resource tools (Virtualized service) are presented in a graphical interface so as to visually show how all these elements work together and provide the user a clear and instant verification of their application architecture, environment, and stages within one view.

Figure 6:
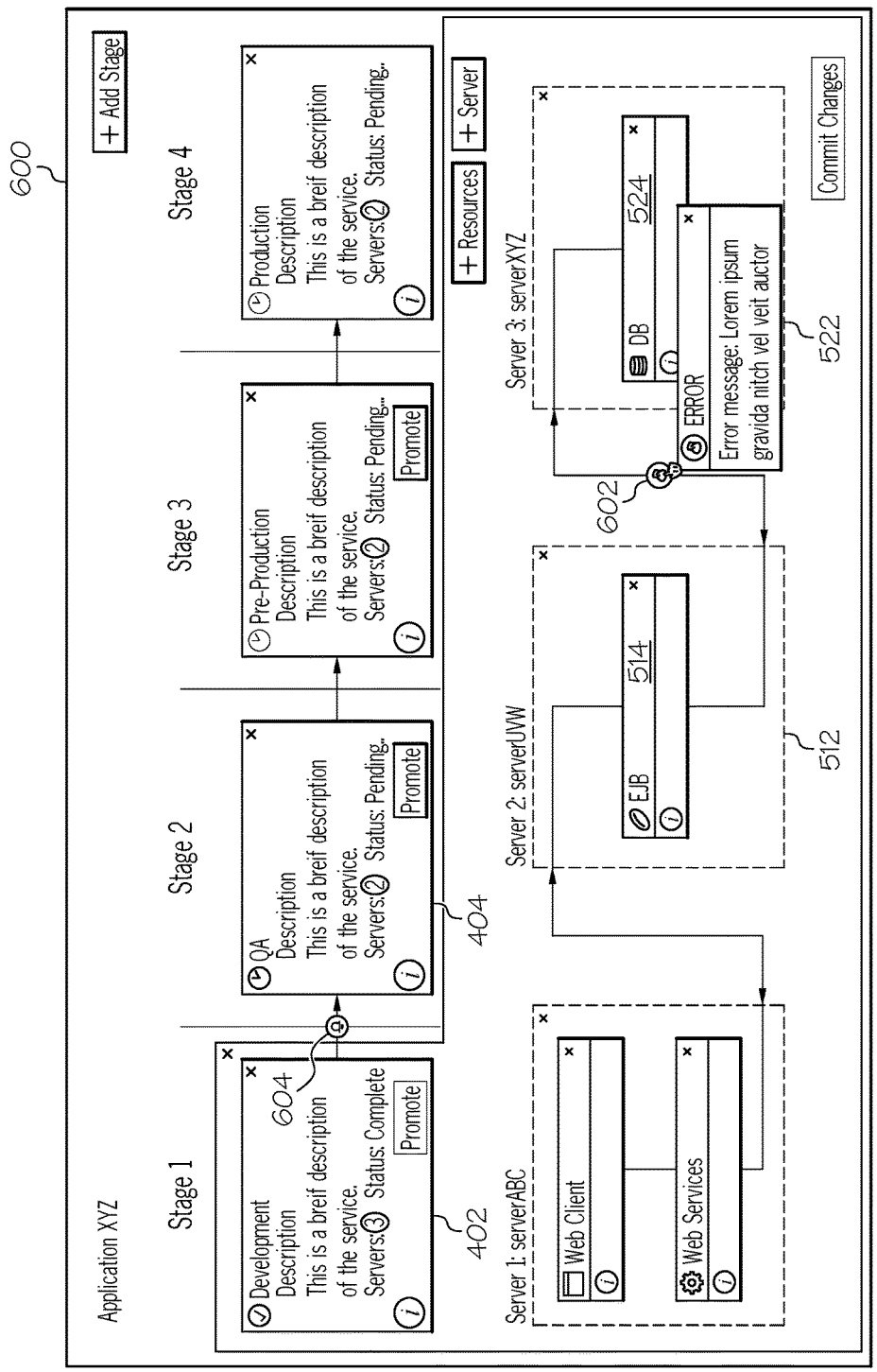
FIG. 6 is an example screenshot of a graphical user interface for testing a deployment resource architecture in accordance with embodiments of the present disclosure.

FIG. 6 is an example screenshot of a deployment view 600 graphical user interface for testing a deployment resource architecture in accordance with embodiments of the present disclosure. Deployment view 600 shows an error in promotion between the data protocol hander resource 514 in server 512 and the database resource 524 in server 522. The linkage 602 can include an icon representing the error (and in some cases, the linkage 602 can change colors to provide further visual cues as to the error). In addition, the error can be shown as an icon 604 between the development stage 402 and the QA stage 404.

Figure 7:
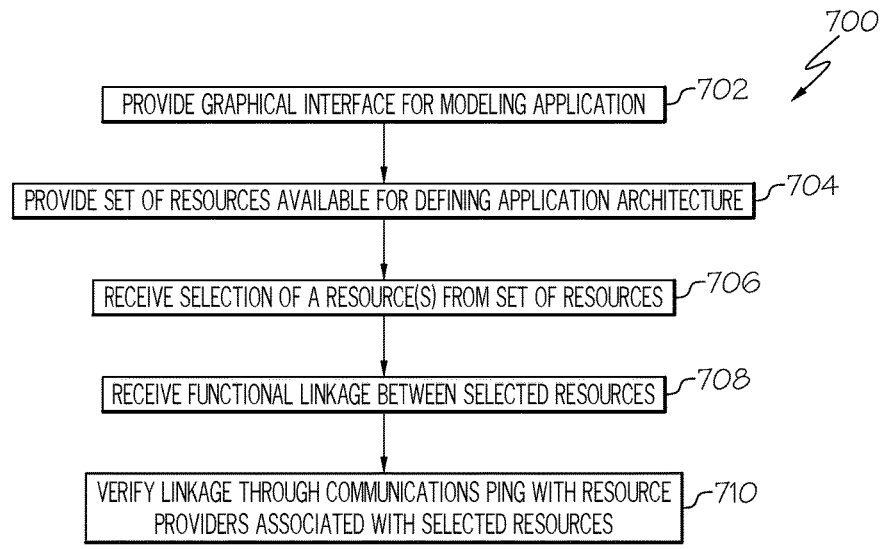
FIG. 7 is a process flow diagram for defining a stage-specific resource architecture in accordance with embodiments of the present disclosure.

FIG. 7 is a process flow diagram 700 for defining a stage-specific resource architecture in accordance with embodiments of the present disclosure. A graphical user interface can be provided to a user, such as an architect (702). A set of resources can be displayed to the user (704). The set of resources (or palette of resources) can be a drop down menu of resources for defining the resource architecture model. A selection of a resource can be received (706). The selection can be in the form of a drag and drop of a resource form the palette onto the modelling canvas. In some instances, the resources are predefined and preconfigured. In some instances, the resources require configuration.

The interface can receive a functional linkage between resources (708). For example, a user can draw an arrow between resources. For predefined resources, linkages can be formed automatically. The interface can verify the functionality in the linkages between resources in the resource architecture model (710). For preconfigured resources, the linkage can be verified through an automatic ping between the resource providers to verify functionality. For unconfigured resources, the linkage verification can be performed by defining and configuring each resource, and affirmatively verifying each linkage in the resource architecture model.

Figure 8:
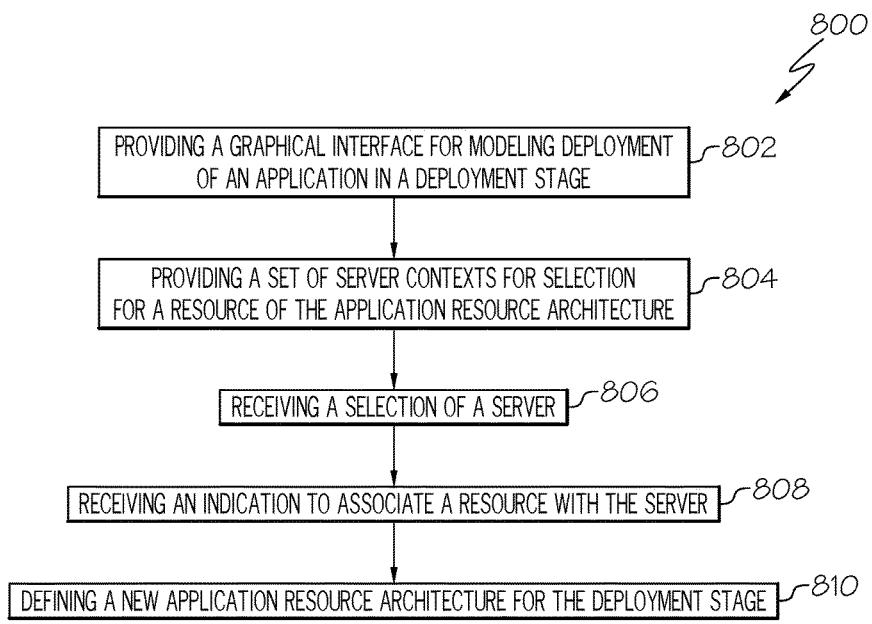
FIG. 8 is a process flow diagram for augmenting a resource architecture with an additional resource or service in accordance with embodiments of the present disclosure.

FIG. 8 is a process flow diagram 800 for augmenting a resource architecture with an additional resource or service in accordance with embodiments of the present disclosure. A graphical user interface can be provided that provides a visualization of a deployment stage for the application (802). A server context can be provided by a palette or set of available servers (804). A server context can be a container that represents a server that can host one or more resources. The user interface can receive a selection of a new server (806). For example, a new server can be dragged and dropped on the a canvas. The interface can receive an indication to associate a resource with the new server (808). For example, the resource located in a first server can be dragged and dropped into the new server. The new resource architecture model can be stored as a new model (810). In some embodiments, the new model can be associated with a different deployment stage than its parent model. In some embodiments, a new resource can be dragged into an existing server or an be dragged into a new server.

Figure 9:
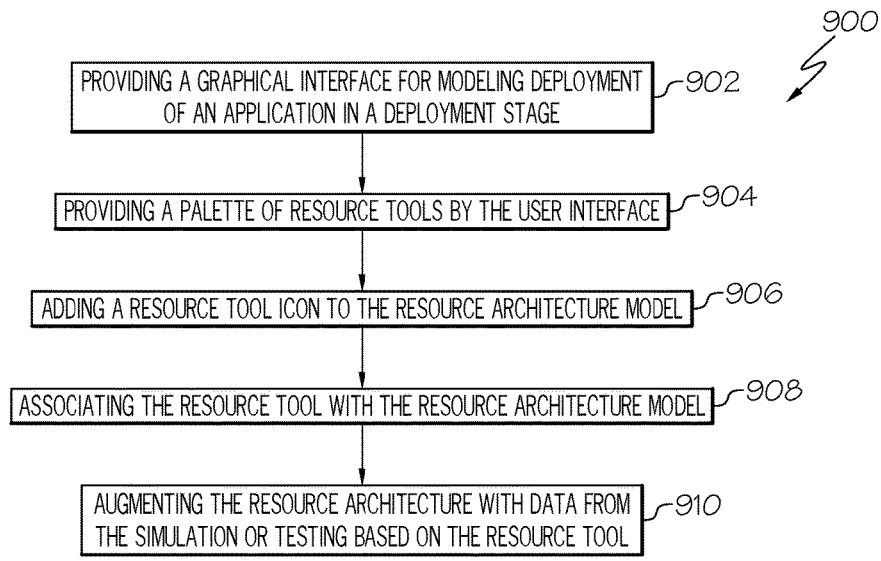
FIG. 9 is a process flow diagram for testing a resource architecture in accordance with embodiments of the present disclosure.

FIG. 9 is a process flow diagram 900 for augmenting a resource architecture with resource tool in accordance with embodiments of the present disclosure. A graphical user interface can be provided that provides a visualization of a deployment stage for the application (902). A resource tool can be provided by a palette or set of available servers (904). The user interface can receive a selection of a resource tool (906). For example, a resource tool can be dragged and dropped on the a canvas. The interface can receive an indication to associate a resource with the resource architecture model (908). The execution or testing of the resource architecture model can using the resource tool can yield data, such as virtualization data or recorded data. The data can be used to further augment, edit, or otherwise improve the resource architecture model (910).

Figure 10:
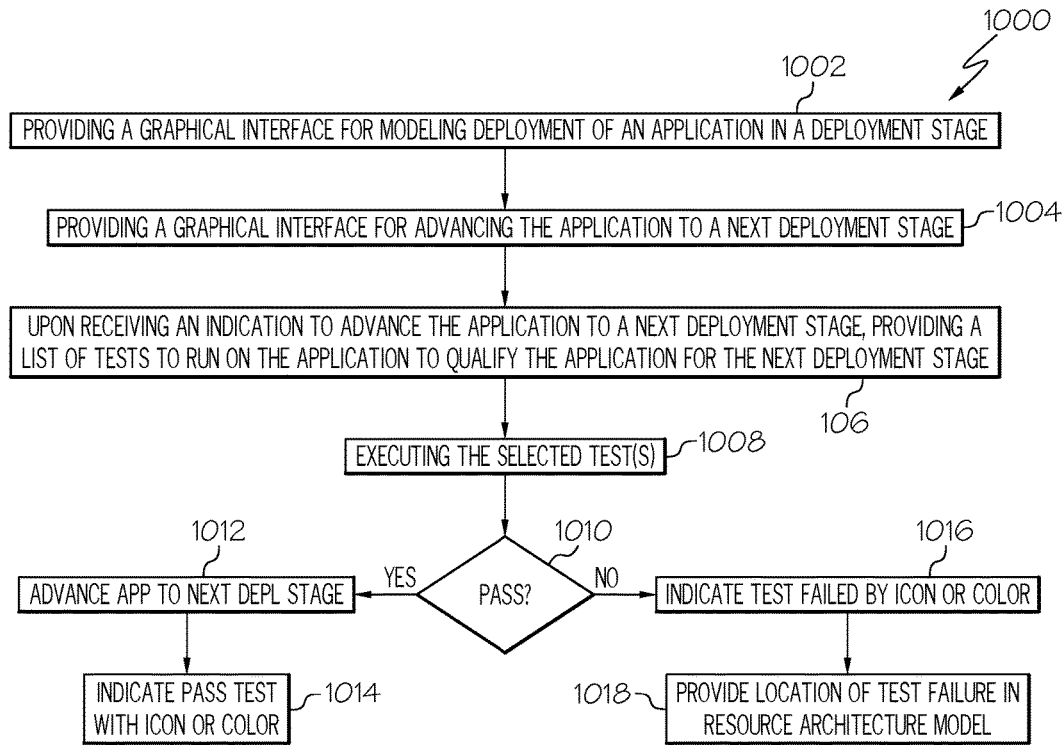
FIG. 10 is a process flow diagram for testing a resource architecture in accordance with embodiments of the present disclosure.

FIG. 10 is a process flow diagram for testing a resource architecture in accordance with embodiments of the present disclosure. A user interface can be provided for visualizing a resource architecture model and deployment stages (1002). An interface is provided for promoting or advancing the resource architecture model to a next stage (1004). Providing a list of tests to run on the resource architecture model and the application to determine whether the resource architecture model can be promoted to the next deployment stage (1006). The test(s) can then be executed (1008).

If the test passes, then the next stage can be made available for viewing and for interacting with a resource architecture model (1012). A pass indicator is displayed in the interface (1014).

If the test does not pass, then a failure indicator is shown in the graphical user interface (1016). A location of the failure is displayed in the resource architecture model and between the stages (1018).

What is claimed is:

1. A method comprising:
providing, via a graphical user interface, a set of user-selectable resources available for defining a resource architecture for an application in development;
receiving, via the graphical user interface, a selection of a first resource for the application;
receiving, via the graphical user interface, a selection of a second resource for the application;
functionally connecting the first resource with the second resource, wherein the first resource, the second resource, and the logical relationship between the first resource and the second resource define the resource architecture for the application;
verifying the resource architecture, wherein verifying the resource architecture comprises communicating over a network with the first resource and with the second resource and verifying that the first resource can communicate over a network with the second resource; and
providing a graphical indication of a result of the verification of the resource architecture;
the method further comprising:
providing a graphical representation of a deployment stage for the application; and
displaying the resource architecture for the application with the deployment stage;
wherein displaying the resource architecture comprises displaying a first resource architecture comprising the selected resource within a first server context at a first deployment stage, the method further comprising:
receiving an instruction to move the first resource architecture to a second deployment stage different from the first deployment stage;
receiving an instruction to associate the resource to a second server context, different from the first server context;
defining a second resource architecture that comprises the resource associated with the second server context; and
associating the second resource architecture with the second deployment stage.

2. The method of claim 1, wherein the second resource architecture associated with the deployment stage defines a runtime server environment for executing deployment of the application during the deployment stage.

3. The method of claim 1, wherein the graphical representation of the deployment stage comprises a user selectable executable instruction; and wherein the method further comprises:
receiving a selection of an executable instruction for the application; and
associating the executable instruction with the second resource architecture and the deployment stage.

4. The method of claim 3, further comprising:
receiving, via a user-selectable interface, an instruction to advance the first resource architecture from a first deployment stage to a second deployment stage;
providing a list of tests to be executed on the application between the first deployment stage and the second deployment stage;
receiving a selection of a test to be executed on the application; and
storing a selected test with the first resource architecture in the first deployment stage.

5. The method of claim 4, further comprising providing an indication of whether the application passed the tests applied to the application between the first deployment stage and the second deployment stage.

6. The method of claim 1, further comprising:
providing a graphical representation of a data recorder through the graphical user interface; and
receiving an input from a user via the graphical user interface to include a data recorder at an output of the resource, the data recorder configured to record data from the output of the resource during execution of the application at the deployment stage.

7. The method of claim 6, further comprising:
executing the application in a deployment stage using data recorded by the data recorder.

8. The method of claim 1, further comprising:
providing a graphical representation of a first version of the resource architecture in a first deployment stage; and
providing an interface to test a second version of the resource architecture in second deployment stage while simultaneously displaying the first version of the resource architecture in the first deployment stage.

9. The method of claim 8, further comprising:
providing a graphical representation of a test failure for the second version of the resource architecture.

10. The method of claim 1, further comprising providing a graphical representation of a test failure for the resource architecture between two server contexts.

11. A computer program product comprising a non-transitory computer readable storage medium comprising computer readable program code embodied therewith, the computer readable program code comprising:
computer readable program code configured to provide a graphical user interface, the graphical user interface comprises a set of user selectable resources and a canvas onto which a user can drag and drop resources to indicate a selection of a resource for defining a deployment environment;
computer readable program code configured to receive, via the graphical user interface, a drag-and-drop command for selecting of a first resource for the application, wherein the drag-and-drop command comprises a user dragging and dropping a graphical representation of the first resource onto a canvas area of the graphical user interface;
computer readable program code configured to receiving, via the graphical user interface, a drag-and-drop command for selecting of a second resource for the application, wherein the drag-and-drop command comprises a user dragging and dropping a graphical representation of the second resource onto a canvas area of the graphical user interface;

computer readable program code configured to receive an indication of a functional connection between the first resource and the second resource, wherein the first resource, the second resource, and the function connection between the first resource and the second resource define the resource architecture for the application;

computer readable program code configured to verify the resource architecture, wherein verifying the resource architecture comprises communicating over a network with the first resource and with the second resource and verifying that the first resource can communicate over a network with the second resource; and computer readable program code configured to providing a graphical indication of a result of the verification of the resource architecture.

12. The computer program product of claim 11, further comprising:

computer readable program code configured to provide a graphical representation of a deployment stage for the application; and computer readable program code configured to display the resource architecture for the application with the deployment stage.

13. The computer program product of claim 12, wherein displaying the resource architecture comprises displaying a first resource architecture comprising the selected resource within a first server context at a first deployment stage, the computer program product further comprising:

computer readable program code configured to receive an instruction to move the first resource architecture to a second deployment stage different from the first deployment stage;

computer readable program code configured to receive an instruction to associate the resource to a second server context, different from the first server context;

computer readable program code configured to define a second resource architecture that comprises the resource associated with the second server context; and computer readable program code configured to associate the second resource architecture with the second deployment stage.

14. The computer program product of claim 13, wherein the second resource architecture associated with the deployment stage defines a runtime server environment for executing deployment of the application during the deployment stage.

15. The computer program product of claim 13, wherein the graphical representation of the deployment stage comprises a user selectable executable instruction; and wherein the computer program product further comprises:

computer readable program code configured to receive a selection of an executable instruction for the application; and computer readable program code configured to associate the executable instruction with the second resource architecture and the deployment stage.

16. The computer program product of claim 15, further comprising:

computer readable program code configured to receive, via a user-selectable interface, an instruction to advance the first resource architecture from a first deployment stage to a second deployment stage;

computer readable program code configured to provide a list of tests to be executed on the application between the first deployment stage and the second deployment stage;

computer readable program code configured to receive a selection of a test to be executed on the application; and computer readable program code configured to store a selected test with the first resource architecture in the first deployment stage.

17. The computer program product of claim 16, further comprising computer readable program code configured to provide an indication of whether the application passed the tests applied to the application between the first deployment stage and the second deployment stage.

18. The computer program product of claim 12, further comprising:

computer readable program code configured to provide a graphical representation of a data recorder through the graphical user interface; and computer readable program code configured to receive an input from a user via the graphical user interface to include a data recorder at an output of the resource, the data recorder configured to record data from the output of the resource during execution of the application at the deployment stage.

* * * * *